United States Patent
Das et al.

(10) Patent No.: US 10,693,810 B1
(45) Date of Patent: Jun. 23, 2020

(54) METHOD AND SYSTEM FOR MANAGING INPUT OUTPUT PER SECOND (IOPS) IN FIBER CHANNEL NETWORK TOPOLOGY

(71) Applicant: Wipro Limited, Bangalore (IN)

(72) Inventors: Rishav Das, Howrah (IN); Sourav Mudi, Burdwan (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/276,653

(22) Filed: Feb. 15, 2019

(30) Foreign Application Priority Data

Dec. 12, 2018 (IN) .............................. 201841047046

(51) Int. Cl.
| | |
|---|---|
| G06F 11/10 | (2006.01) |
| H04L 12/947 | (2013.01) |
| H04L 12/931 | (2013.01) |
| H04L 12/24 | (2006.01) |
| H04L 12/721 | (2013.01) |
| H04L 12/935 | (2013.01) |

(52) U.S. Cl.
CPC .............. H04L 49/25 (2013.01); H04L 41/12 (2013.01); H04L 45/12 (2013.01); H04L 49/30 (2013.01); H04L 49/357 (2013.01)

(58) Field of Classification Search
CPC ..... H04B 7/0413; H04L 1/0071; H04H 60/73
See application file for complete search history.

(56) References Cited

U.S. PATENT DOCUMENTS

| | | | | |
|---|---|---|---|---|
| 4,532,626 A | * | 7/1985 | Flores ................... | H04L 12/417 370/438 |
| 6,356,944 B1 | * | 3/2002 | McCarty ............... | G06F 13/126 709/222 |

FOREIGN PATENT DOCUMENTS

EP  0 869 642 A2  10/1998

OTHER PUBLICATIONS

Hsu, C., "Inside-Out: Reliable Performance Prediction for Distributed Storage Systems in the Cloud", SRDS (2016) pp. 1-10.
Mehravari, N., "Performance and Protocol Improvements for Very High Speed Optical Fiber Local Area Networks Using a Passive Star Topology", IEEE, Journal of Lightwave Technology, vol. 8, No. 4, Apr. 1990, pp. 520-530.

(Continued)

*Primary Examiner* — Zhiren Qin

(74) *Attorney, Agent, or Firm* — Finnegan, Henderson, Farabow, Garrett & Dunner, LLP

(57) ABSTRACT

A method of managing Input Output per Second (IOPS) in Fiber Channel network topology is disclosed. The method includes initializing a plurality of network parameters into dependent variables and independent variables. The method includes performing multilinear regression analysis on at least one of the dependent variables and the independent variables to predict a value of at least one dependent variable. The method includes clustering each of a plurality of switches into a plurality of categories based on the predicted value. The method includes determining a plurality of routes between source and destination switches associated with an Iops request. The method includes establishing a connection between the source and destination switches through a shortest route including a subset of switches. The method includes modulating, for each switch in the subset, a bandwidth according to an IOPS associated with the IOPS request and a category associated with each switch in the subset.

19 Claims, 5 Drawing Sheets

(56) References Cited

OTHER PUBLICATIONS

Ren, W., et al., "Consensus Seeking in Multiagent Systems for Under Dynamically Changing Interaction Topologies", IEEE Transactions of Automatic Control, vol. 50, No. 5, May 2005, pp. 655-661.

* cited by examiner

| SRC 202 | DST 204 | IOPS Requirement 206 |
|---|---|---|
| 192.159.222.4 | 168.159.132.5 | 3.1 |
| 168.132.215.3 | 198.165.132.6 | 1.69 |
| 188.200.211.36 | 135.165.122.89 | 6.59 |

METHOD AND SYSTEM FOR MANAGING INPUT OUTPUT PER SECOND (IOPS) IN FIBER CHANNEL NETWORK TOPOLOGY

TECHNICAL FIELD

This disclosure relates generally to Input Output Per Second (IOPS) in fiber channel network topology, and more particularly to a method and system for managing IOPS in fiber channel network topology.

BACKGROUND

Data center is one of the basic requirement of enterprise storage and networking, in order to store data in bulk. Some conventional systems aim to build a data center in most optimized and efficient way to reduce the overall cost of maintaining a data center. However, due to various technical constraints, for example fixed set of topology design of fiber channel, fixed number of required switches, fixed number of required ports, or fixed bandwidth, overall cost cannot be reduced. Thus, evolution of fiber channel topologies are widely required in data center designs.

The fiber channel topologies have an expensive architectures in terms of product cost and maintenance. One of the problems in fiber channel topology is the set of predefined bandwidth which takes fixed infrastructure and cost irrespective of its uses and demand. Another problem is the overflow bandwidth and cache, which increases costs for an end user. If the bandwidth remains fixed, the topology design also remains fixed. This adversely effects the latency of IOPS transmission within the network. Moreover, no on-demand supply of IOPS are provided, which may be required in OLTP data store systems and services, such as, Automated Teller Machine (ATM) and financial transactions.

Additionally, conventional systems have additional drawbacks associated with efficient use of fiber channel topology. The additional drawbacks include increased cost due to high defined bandwidth, more amount of unused resources available in periodic cycle, high cost associated with Internet Service Provider (ISP), high propagation delay/less propagation delay according to fixed bandwidth, uneven buffer management in the topology between multiple switch, and the same bandwidth being shared by all devices on the loop.

SUMMARY

In one embodiment, a method of managing Input Output per Second (IOPS) in fiber channel network topology that includes a plurality of switches is disclosed. In one embodiment, the method may include initializing of a plurality of network parameters associated with the plurality of switches into a plurality of dependent variables and a plurality of independent variables for each of the plurality of switches. The method may further include performing for each of the plurality of switches a multilinear regression analysis on at least one of the plurality of dependent variables and at least one of the plurality of independent variables to predict a value of the at least one dependent variable. The method may further include evaluating the validated data based on a predefined criteria associated with the target application. The method may further include clustering each of the plurality of switches into a plurality of categories based on the value of the at least one of the plurality of dependent variables associated with each of the plurality of switches. The method may further include determining a plurality of routes between a source switch and a destination switch associated with an IOPS request. The method may further include establishing a connection between the source switch and the destination switch through a shortest route from the plurality of routes, wherein the shortest route includes a subset of switches from the plurality of switches and the method may further include modulating a bandwidth according to an IOPS associated with the IOPS request and a category associated with each switch in the subset.

In another embodiment, an IOPS managing device for managing IOPS in fiber channel network topology that includes a plurality of switches is disclosed. The IOPS managing device includes a processor and a memory communicatively coupled to the processor, wherein the memory stores processor instructions, which, on execution, causes the processor to initialize a plurality of network parameters associated with the plurality of switches into a plurality of dependent variables and a plurality of independent variables for each of the plurality of switches. The processor instructions further cause the processor to perform for each of the plurality of switches a multilinear regression analysis on at least one of the plurality of dependent variables and at least one of the plurality of independent variables to predict a value of the at least one dependent variable. The processor instructions further cause the processor to cluster each of the plurality of switches into a plurality of categories based on the value of the at least one of the plurality of dependent variables associated with each of the plurality of switches. The processor instructions further cause the processor to determine a plurality of routes between a source switch and a destination switch associated with an IOPS request. The processor instruction further cause the processor to establish a connection between the source switch and the destination switch through a shortest route from the plurality of routes, wherein the shortest route includes a subset of switches from the plurality of switches. The processor instruction further cause the processor to modulate for each switch in the subset, a bandwidth according to an IOPS associated with the IOPS request and a category associated with each switch in the subset.

In yet another embodiment, a non-transitory computer-readable storage medium is disclosed. The non-transitory computer-readable storage medium has instructions stored thereon, a set of computer-executable instructions causing a computer that includes one or more processors to perform steps that include initializing, a plurality of network parameters associated with the plurality of switches into a plurality of dependent variables and a plurality of independent variables for each of the plurality of switches. The steps further include performing for each of the plurality of switches, a multilinear regression analysis on at least one of the plurality of dependent variables and at least one of the plurality of independent variables to predict a value of the at least one dependent variable. The steps include clustering, each of the plurality of switches into a plurality of categories based on the value of the at least one of the plurality of dependent variables associated with each of the plurality of switches. The steps further include determining, a plurality of routes between a source switch and a destination switch associated with an IOPS request. The steps include establishing, a connection between the source switch and the destination switch through a shortest route from the plurality of routes, wherein the shortest route includes a subset of switches from the plurality of switches. The steps further include, for each switch in the subset, modulating, a bandwidth according to an IOPS associated with the IOPS request and a category associated with each switch in the subset.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
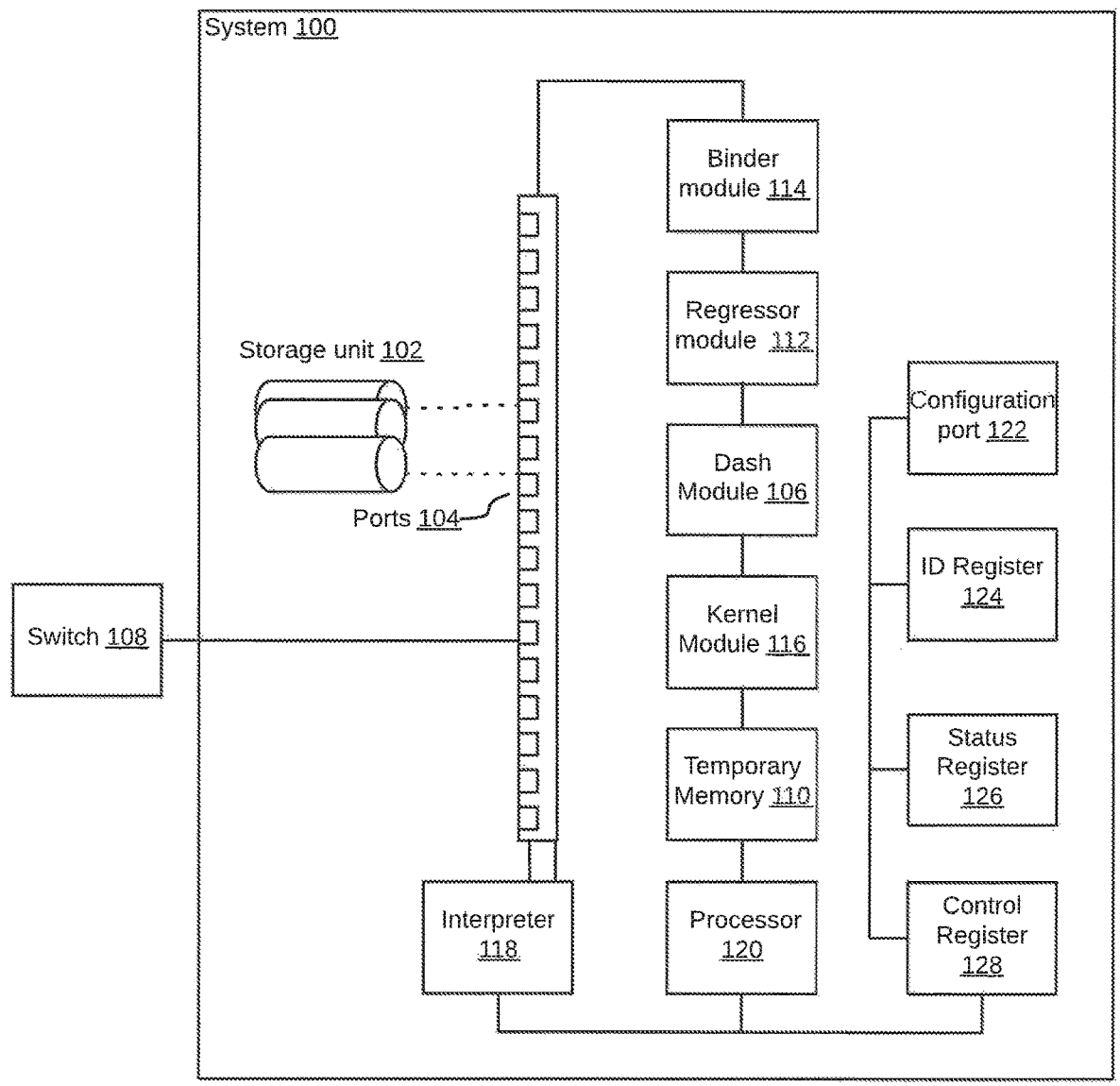
FIG. 1 is a block diagram illustrating a system for managing Input Output Per Second (IOPS) in the fiber channel network topology, in accordance with an embodiment.

In one embodiment, a system 100 for managing Input Output Per Second (LOPS) in a fiber channel network topology is illustrated in the FIG. 1, in accordance with an embodiment. As will be appreciated, the system 100 may be implemented for various fiber channel network topologies. Examples of these fiber channel network topologies may include, but are not limited to, point to point topology, arbitrated fiber channel topology, current state of optimization topology, or fiber switch topology.

The system 100 may be employed to support an application or to provide a service. Examples of the application or the service may include, but are not limited to On-line Transaction Processing (OLTP), ATM, or On-line Analytic Processing (ONAP).

To this end, the system 100 may include a storage unit 102 that is communicatively coupled to a plurality of ports 104. The storage unit 102, for example, may include but is not limited to Random Access Memory (RAM), memory drives, or removable disc drives. Various modules in the system 100 may access information stored in the storage unit 102, via the plurality of ports 104. A dash module 106 in the system 100 determines dependent variables and independent variables associated with a plurality of switches (for example, a switch 108) in the fiber channel network topology. Examples of the dependent and independent variables may include, but are not limited to cache size, topology bandwidth, cache transaction, CPU usage, fragmentation ratio, packet size, or jitter rate. This is further explained in detail in conjunction with FIG. 2. Each of the plurality of switches may be communicatively coupled to the plurality of ports 104, The dash module 106 further maintains packet transmission from one switch to another switch in an internal database of the storage unit 102, via the plurality of ports 104.

The dash module 106 may then store the dependent and independent variables for the plurality of switches in a temporary memory unit 110. A regressor module 112 may then perform multilinear regression analysis on the dependent and independent variables stored in the temporary memory unit 110 to predict real time values of the dependent and independent variables. By way of an example, the regressor module 112 may predict values of the dependent and the independent variables determined for the switch 108.

The real time values of the dependent and independent variables predicted for the plurality of switches indicate performance level for each of the plurality of switches. Thus, based on the real time values of the dependent and independent variables predicted by the regressor module 112, a binder module 114 may cluster the plurality of switches in accordance with their respective performance levels. This is further explained in detail in conjunction with FIG. 2.

The system 100 further includes a kernel module 116, which is an operating system for the plurality of switches and the fiber channel network topology. The kernel module 116 takes data from various modules in the system 100 and further shares the data with an interpreter 118. The interpreter 118 then converts the received data in a format that is readable by hardware units that are present within the system 100 and are externally coupled to the system 100.

The set of instructions and algorithms that enable functioning of the system 100 are stored in a processor 120, which includes a volatile memory (for example, RAM). The system 100 further includes a configuration port 122 that may be communicatively coupled to an ID Register 124, a status register 126, and a control register 128, which collectively provide information associated with the switch 108, to the configuration port 122. The information associated with the switch 108 may include, but is not limited to an IP address, port identifier, or bandwidth requirement.

The system 100 may improve speed of the IOPS in the fiber channel network topology, while reducing overall cost by distributing the total bandwidth amongst the plurality of switches in the fiber channel network topology. In an embodiment, the system 100 may implement as an IOPS managing engine. In another embodiment, the system 100 may include an IOPS managing device that may implement the IOPS managing engine.

Figures 2A, 2B:
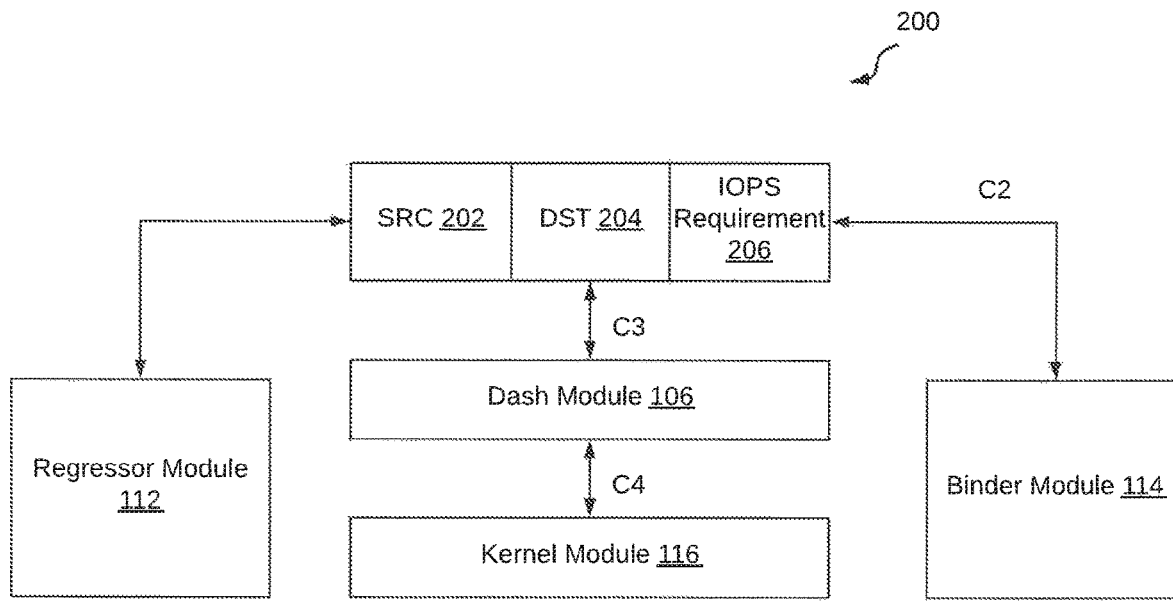
FIG. 2A is a block diagram illustrating a system for managing IOPS in the fiber channel network topology, in accordance with another embodiment.
FIG. 2B illustrates a dash module of a system for managing IOPS storing metadata inside a hash map table in accordance with an embodiment.

Referring now to FIGS. 2A and 2B, a block diagram of a system 200 for managing IOPS in the fiber channel network topology is illustrated, in accordance with another embodiment. In some embodiments, the system 200 may include modules that perform various functions to manage IOPS transmission for switches within the fiber channel network topology, in order to increase the speed of the IOPS transmission and save the available bandwidth within the fiber channel network topology.

The system 200 is a subset of the system 100, such that, the system 200 may include the regressor module 112, the binder module 114, the dash module 106, and the kernel module 116. As will be appreciated by those skilled in the art, all such aforementioned modules 106, 112, 114, and 116 may be represented as a single module or a combination of different modules. Moreover, as will be appreciated by those skilled in the art, each of the modules 106, 112, 114, and 116 may reside, in whole or in parts, on one device or multiple devices in communication with each other.

The dash module 106 manages the IOPS in the fiber channel network topology. The dash module 106 understands the main underlying topology over which IOPS transmission may be performed. Additionally, the dash module 106 may initialize dependent variables and independent variables associated with each switch within the fiber channel network topology. Examples of the dependent variables may include, but are not limited to IOPS, bandwidth jitter rate, latency, or error rate. Similarly, examples of the independent variables may include, but are not limited to cache size, cache transaction, CPU usage, fragmentation ratio, packet size, jitter rate, or buffer consumption. The dash module 106 may also maintain an internal database within the storage unit 102 and may add information related to packets being transmitted from one switch to the other in the fiber channel network topology. The dash module 106 may also keep a track of the size and speed defined by a network vendor for the fiber channel network topology. The dash module 106 may further forward the above discussed data or information to the regressor module 112 and the binder module 114.

The regressor module 112 is an intelligent module that may perform multilinear regression analysis on each dependent and independent variable received from the dash module 106. In an exemplary embodiment, during the multilinear regression analysis, dependent variables may be represented by 'Y' and the independent variables may be represented by '$X_n$'. Through multilinear regression, the regressor module 112 may predict values of each dependent and independent variable with high confidence level and may further modulate one or more dependent and independent variables based on the predicted values. This is further explained in detail in conjunction with FIG. 4.

The binder module 114 may receive predicted values of each of the dependent and independent variables from the regressor module 112 and accordingly cluster or categorize the switches in one of a high active category, a moderate active category, and a least active category. This is further explained in detail in conjunction with FIG. 4. Also, the binder module 114 may determine the possible routes between a source switch and a destination switch associated with an lops request associated with the source and destination switch. Further, the binder module 114 may calculate distance between the source switch and the destination switch using 'Euclidean distance,' in order to complete the IOPS request.

The dash module 106 stores metadata that may carry information about IP addresses of the source switch (represented by an SRC 202), IP addresses of the destination switch (represented by a DST 204), and the IOPS requirement (represented by an IOPS Requirement 206) associated with an IOPS request between the source switch and the destination switch. The dash module 106 may store the metadata inside a hash map table 208, as depicted in FIG. 2B. The hash map table 208 may include a column 210, a column 212, and a column 214. As depicted, the column 210 includes IP addresses of three source switches, the column 212 includes IP addresses of three destination switches corresponding to the three source switches, and the column 214 includes the IOPS requirements. By way of an example, in the hash map table 208, the value of IOPS requirement for an IOPS request initiated between a source switch having the IP address "192.159.222.4" and a destination switch having the IP address "168.159.132.5" is '3.1'.

In addition to the above data, the hash map table 208 may be used to store additional information provided by the kernel module 116. The additional information, for example, may include but is not limited to jitter rate, latency, source IP, destination IP, or IOPS rate The modules within the system 200 may be connected using wireless or wired communication protocols, which may include, but are not limited to Serial Advanced Technology Attachment (SATA), Integrated Drive Electronics (IDE), IEEE 1394, Universal Serial Bus (USB), fiber channel, Small Computer Systems Interface (SCSI), STD Bus, RS-232, RS-422, RS-485, 120, SPI, Microwire, 1-Wire, IEEE 1284, Intel Quick Path Interconnect, InfiniBand, PCIe etc.

The system 200 may be implemented in a variety of computing systems, for example, but not limited to switch, gateway, router, or server. The system 200 may be adapted to exchange data with other components or service providers using a wide area network or the Internet.

Figure 3:
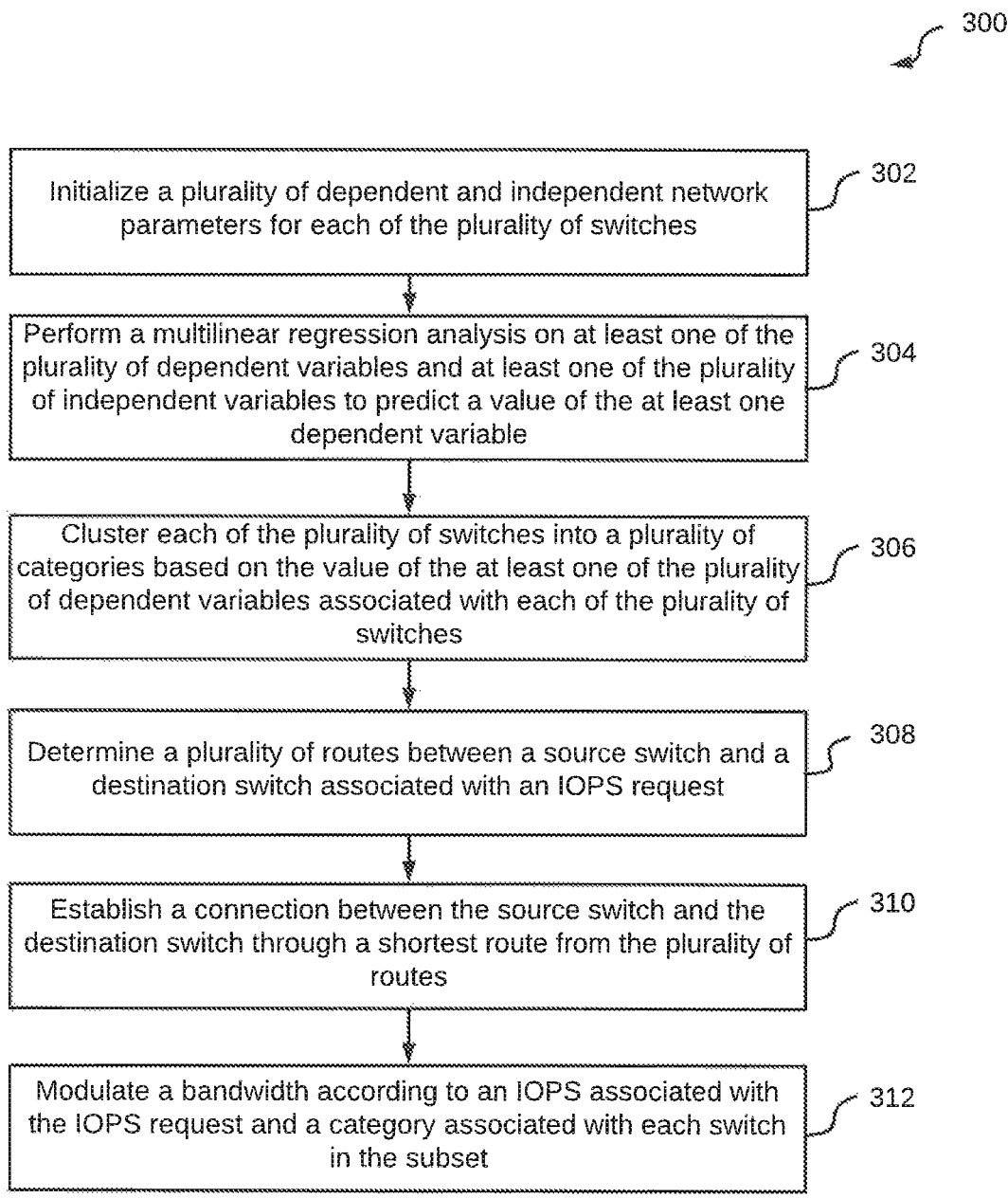
FIG. 3 illustrates a flowchart of a method for managing IOPS in fiber channel network topology, in accordance with an embodiment.

Referring now to FIG. 3, a flowchart of a method 300 for managing IOPS in a fiber channel network topology that includes a plurality of switches is illustrated, in accordance with an embodiment. The method 300 may include the steps of initializing, by an IOPS managing device, a plurality of network parameters associated with the plurality of switches into a plurality of dependent variables and a plurality of independent variables for each of the plurality of switches at step 302; performing for each of the plurality of switches, by the IOPS managing device, a multilinear regression analysis on at least one of the plurality of dependent variables and at least one of the plurality of independent variables to predict a value of the at least one dependent variable at step 304; clustering, by the IOPS managing device, each of the plurality of switches into a plurality of categories based on the value of the at least one of the plurality of dependent variables associated with each of the plurality of switches at step 306; determining, by the IOPS managing device, a plurality of routes between a source switch and a destination switch associated with an IOPS request at step 308; establishing, by the IOPS managing device, a connection between the source switch and the destination switch through a shortest route from the plurality of routes, wherein the shortest route includes a subset of switches from the plurality of switches at step 310; and for each switch in the subset, modulating, by the IOPS managing device, a bandwidth according to an IOPS associated with the IOPS request and a category associated with each switch in the subset at step 312.

In some embodiments, initializing the dependent and independent variables at step 302 may include the steps of further dividing the variables into dependent variables and independent variables. For further analysis, the independent variables may be represented by 'X' and may include cache size, cache transaction, CPU usage, fragmentation ratio, packet size, buffer consumption, or jitter rate. Similarly, the dependent variables may be represented by 'Y' and may include IOPS, bandwidth jitter rate, latency, maximum frame rate, maximum throughput, maximum concurrent connection, or error rate.

At step 304, multilinear regression analysis is performed over the initialized dependent and independent variables in order to predict value of dependent variables, i.e., 'Y'. The value of the dependent variables may be predicted based on the initialized values of the independent variables, i.e., 'X', In an embodiment, the value of the dependent variables, i.e., 'Y,' may be predicted by calculating the slope and intercept of the multilinear regression analysis performed on values of the initialized dependent and independent variables. By way of an example, the Y variable may be the IOPS requirement associated with an IOPS request and values for X variables may be related to one or more of the CPU latency, jitter rate, or packet drop.

In an exemplary embodiment, a multilinear regression algorithm may compute the square of values of the X variables and the Y variables in order to reduce the negative values. Thereafter, the multilinear regression algorithm computes a product of values of each X variable with each Y variable. For example, if there are three X variables, i.e., X1 to X3, and one Y variable, i.e., Y, the multilinear regression algorithm may compute the product as: [X1.Y, X2.Y, and X3.Y]. Thereafter, the multilinear regression algorithm may compute an average value for the X variables (represented by Xavg) and an average value for the Y variables (represented by Yavg). Based on the above determined values, the multilinear regression algorithm predicts the value of the Y variables using the equation 1 given below:

$$Y = alpha + beta(X) \quad (1)$$

where, alpha=Yavg−beta (X), which is the intercept of the multilinear regression analysis, beta (X)=SXY/SXX, which is the slope of the multilinear regression analysis, SXY=Sum (XiYi)−n (Xavg. Yavg), where n represents the total number of unique values of an X variable SYY=Sum (Y Yavg)$^2$, SXX=Sum (X2)−n(Xavg).

By way of an example of the exemplary embodiment given above, the X variable is taken as the "size of data dropped" and the Y variable to be predicted is taken as "the time required to drop the packets." A table 1 given below is used to represent various computations done based on the exemplary embodiment given above.

TABLE 1

| X (MB) | Y (S) | X1$^2$ | Y1$^2$ | X$_i$Y |
|---|---|---|---|---|
| 6 | 40 | 36 | 1600 | 240 |
| 4.5 | 35 | 20.25 | 1225 | 157.5 |
| 1 | 12 | 1 | 144 | 12 |
| 3.75 | 26 | 14.06 | 676 | 97.5 |
| 5.2 | 39 | 27.04 | 1521 | 202.8 |
| 6.9 | 49 | 47.61 | 2401 | 338.1 |
| 8.4 | 62 | 70.56 | 3844 | 520.8 |
| 4.7 | 36 | 22.09 | 1296 | 169.2 |
| 7.3 | 58 | 53.29 | 3364 | 423.4 |
| 11.4 | 90 | 129.96 | 8100 | 1026 |
| ΣX = 59.15 | ΣY = 447 | ΣX1$^2$ = 421.86 | ΣY1$^2$ = 24171 | ΣX$_i$Y = 3187.3 |

In the table 1, the first column includes multiple values of the X variable, the second column includes multiple values of the Y variable, the third and fourth column represent the square of X and Y variables respectively, and the fifth column represents the product of X and Y variables. Additionally, in the table 1, a sum of each column is represented in the last row. Based on the values in the table 1, the equations 2 to 7 are executed:

$$Sxx = \sum (x_i - \bar{x})^2 \quad (2)$$
$$= (\sum X1^2) - n(\bar{x})^2$$
$$= 421.86 - 10(5.915)$$
$$= 421.86 - 10(34.99)$$
$$= 421.86 - 349.9$$
$$= 71.96$$

where, $$\bar{x} = \sum X/10 = 59.15/10 = 5.915$$
$$Sxy = \sum (xi - \bar{x})(yi - \bar{y}) = (\sum xiyi) - n(\bar{x})(\bar{y}) \quad (3)$$
$$= 3187.3 - 10(5.915)(44.7)$$
$$= 3187.3 - 2644$$
$$= 543.3$$

where, $$\bar{y} = \sum Y/10 = 447/10 = 44.7$$
$$Syy = \sum (yi - \bar{y}) = (\sum yi^2) - n(\bar{y})^2 \quad (4)$$
$$= 24171 - 447$$
$$= 23724$$

$$y = \alpha + \beta x \quad (5)$$

where, y is the time required to drop packets, x is the value of data dropped.

The value of β, which is the slope, is derived based on equations 2 and 3, as depicted in the equations 6 below:

$$\beta = Sxy/Sxx \quad (6)$$
$$= 543.3/71.96 = 7.55,$$

Further, the value of α is derived based on equations 5 and 6, as depicted in the equation 7 given below:

$$\alpha = y - \beta x \quad (7)$$
$$= 44.7 - 7.55(5.915)$$
$$= 0.04$$

Thus, when values of α and β have been derived, the equation 5 is used to determine values of y, based on predicted values of x. By way of an example, when the value of x is 2 MB of data dropped, the value of y is computed as 15.14 seconds of time that is required to drop packets, as depicted below:

$$y = \alpha + \beta(x) = 0.04 + 7.55(2) = 15.14$$

Similarly, for different values of x, the computed values of y are depicted below:

$$y = \alpha + \beta(x) = 0.04 + 7.55(6) = 45.34 \text{ sec [when } x=6]$$

$$y = \alpha + \beta(x) = 0.04 + 7.55(4.5) = 34 \text{ sec [when } x=4.5]$$

$$y = \alpha + \beta(x) = 0.04 + 7.55(5.2) = 39.3 \text{ sec [when } x=5.2]$$

$$y = \alpha + \beta(x) = 0.04 + 7.55(6.9) = 52.135 \text{ sec [when } x=6,9]$$

$$y = \alpha + \beta(x) = 0.04 + 7.55(8.4) = 63 \text{ sec [when } x=8.4]$$

$y=\alpha+\beta(x)=0.04+7.55(4.7)=35.525$ sec [when $x$=4.7]

$y=\alpha+\beta(x)=0.04+7.55(7.3)=55.16$ sec [when $x$=7.3]

$y=\alpha+\beta(x)=0.04+7.55(11.4)=86.11$ sec [when $x$=11.4]

At step 306, the method 300 may cluster the plurality of switches in the fiber channel network topology into a plurality of categories, based on the predicted values of one or more dependent variables (for example, IOPS requirement associated with the IOPS request). The plurality of categories may include, but are not limited to as a high active category, a moderate active category, and a least active category. The high active category may be associated with a first predefined value range of each of the plurality of dependent variables. Thus, a switch for which value each dependent variable is within the first predefined value range, may be categorized under clustered under the high active category. Similarly, the moderate active category is associated with a second predefined value range and the least active category is associated with a third predefined value range.

At step 308, the method 300 may determine a plurality of routes between a source switch and a destination switch for routing an IOPS request initiated by the source switch for the destination switch. In other words, a number of possible routes between the source and the destination switch may be determined. The plurality of routes may be arranged in ascending order of the distance between the source switch and the destination switch. The distance between the source and the destination switches may be calculated using Dijkstra's algorithm. In order to compute the distance, IP address of both the source and destination switches may be used. The IP address may be determined from packet metadata of packets exchanged between the source and destination switches.

In an embodiment, the time required for an acknowledgement to reach a source switch may be used to determine distance between the source switch and the destination switch. By way of an example, there may be three possible routes between the source switch and the destination switch, i.e., route A, B, and C. The numeric value of the time taken to receive the acknowledgement on each of these routes may be represented as: B=5.25, A=7.62, C=6.39. Based on these numerical values, the three routes may be arranged in the following order: B→C→A.

From the plurality of routes, the method 300 may select the shortest route between the source switch and destination switch to establish a connection. In continuation of the example above, based on the order in which the three routes are arranged, the shortest route, i.e., route B may be selected to establish the connection.

At step 310, the method 300 may establish the connection between the source switch and destination switch through the shortest route. The shortest route includes a subset of switches from the plurality of switches. Each switch in the subset matches with IOPS attributes of the IOPS request. In an embodiment, if one or more switches in the shortest route do not match with the IOPS attributes, then a subsequent route is selected to establish the connection. In continuation of the example above, in case one or more switches on the route B do not match the IOPS attributes, the route C may be selected to establish the connection. This is further explained in detail in conjunction with FIG. 4.

At step 312, the method 300 may modulate the bandwidth for each switch in the subset. Bandwidth for a switch in the subset may be modulated based on the IOPS associated with the IOPS request and a category associated with the switch.

When the IOPS associated with the IOPS request has high requirement of bandwidth, the IOPS request is provided with the high bandwidth. Similarly, when the bandwidth requirement drops, the bandwidth allocation also drops.

Figure 4:
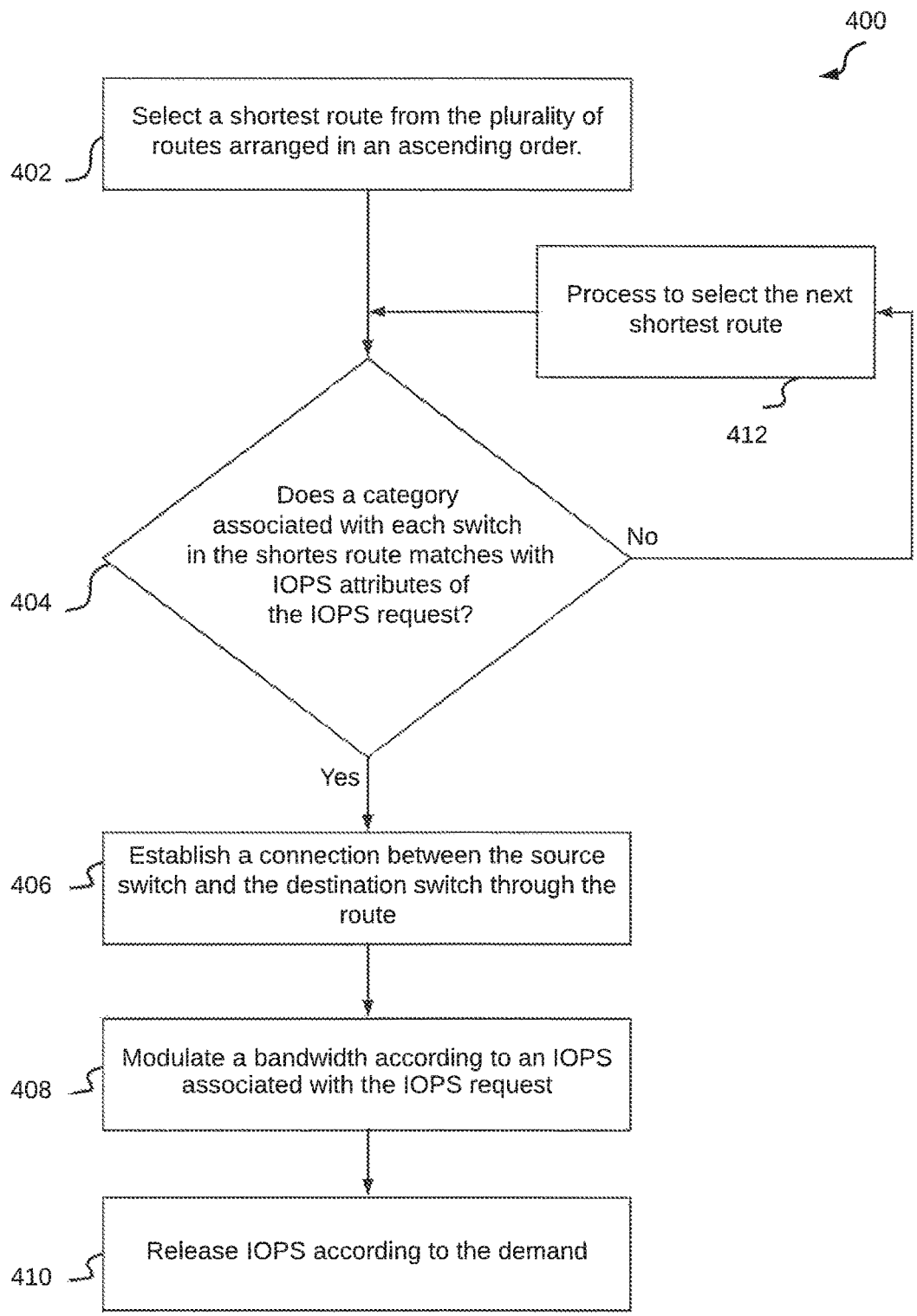
FIG. 4 illustrates a flowchart of a method for determining a route between a source switch and a destination switch to complete an IOPS request, in accordance with an embodiment.

Referring now to FIG. 4, a flowchart 400 of a method for selecting a route to establish a connection between a source switch and a destination switch is illustrated, in accordance with an embodiment. The route is selected in order to complete an IOPS request associated with the source and destination switches, such that, each switch on the route matches the IOPS attributes of the IOPS request.

At step 402, a shortest route is selected from the plurality of routes that are arranged in an ascending order. Further at step 404, a check is performed to determine whether a category associated with each switch in the shortest route matches with the IOPS attributes of the IOPS request. If a category associated with each switch in the shortest route matches with the IOPS requirement, a connection is established between the source switch and the destination switch through the shortest route at step 406. Further, at step 408, the bandwidth of each switch on the shortest route is modulated based on an IOPS associated with the IOPS request. At step 410, the IOPS associated with the IOPS request transmitted through the established connection is released. This has already been explained in detail in conjunction with FIG. 3.

Referring back to step 404, if a category associated with at least one switch in the shortest route does not match with the IOPS attributes, at step 412 the next shortest route is selected from the plurality of routes, based on the ascending order in which the plurality of routes are arranged. Thereafter, the control moves to step 404. This process continues iteratively, till a category of each switch of the route that is currently selected, matches with the IOPS attributes of the IOPS request.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
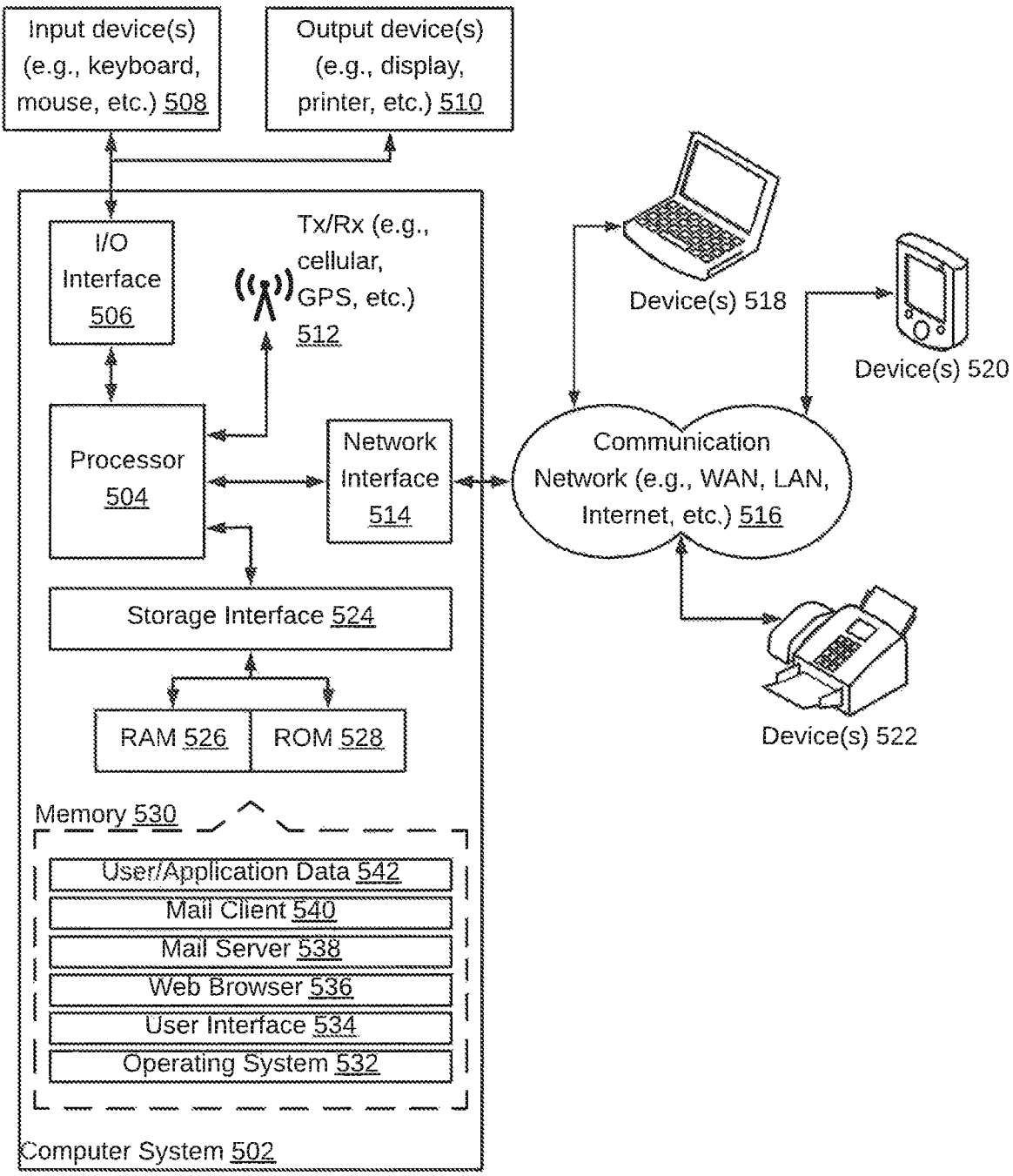
FIG. 5 is a block diagram of an exemplary computer system for implementing embodiments.

The disclosed methods and systems may be implemented on a conventional or a general-purpose computer system, such as a personal computer (PC) or server computer. Referring now to FIG. 5, a block diagram of an exemplary computer system 502 for implementing various embodiments is illustrated. The computer system 502 may include a central processing unit ("CPU" or "processor") 504. The processor 504 may include at least one data processor for executing program components for executing user or system-generated requests. A user may include a person, a person using a device such as such as those included in this disclosure, or such a device itself. The processor 504 may include specialized processing units such as integrated system (bus) controllers, memory management control units, floating point units, graphics processing units, digital signal processing units, etc. The processor 504 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. The processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 504 may be disposed in communication with one or more input/output (I/O) devices via an I/O interface 506. The I/O interface 506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using the I/O interface 506, the computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 510 may be a printer, fax machine, video display (for example, cathode ray tube (CRT), liquid crystal display (LCD), light-emitting diode (LED), plasma, or the like), audio speaker, etc. In some embodiments, a transceiver 512 may be disposed in connection with the processor 504. The transceiver 512 may facilitate various types of wireless transmission or reception. For example, the transceiver 512 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, the processor 504 may be disposed in communication with a communication network 514 via a network interface 516. The network interface 516 may communicate with the communication network 514. The network interface 516 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. The communication network 514 may include, without limitation, a direct interconnection, local area network (LAN), wide area network (WAN), wireless network (for example, using Wireless Application Protocol), the Internet, etc. Using the network interface 516 and the communication network 514, the computer system 502 may communicate with devices 518, 520, and 522. The devices 518, 520, and 522 may include, without limitation, personal computer(s), server(s), fax machines, printers, scanners, various mobile devices such as cellular telephones, smartphones (for example, APPLE® (PHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS' gaming console, SONY® PLAYSTATION® gaming console, etc.), or the like. In some embodiments, the computer system 502 may itself embody one or more of these devices.

In some embodiments, the processor 504 may be disposed in communication with one or more memory devices (for example, RAM 526, ROM 528, etc.) via a storage interface 524. The storage interface 524 may connect to a memory 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 530 may store a collection of program or database components, including, without limitation, an operating system 532, a user interface application 534, a web browser 536, a mail server 538, a mail client 540, user/application data 542 (for example, any data variables or data records discussed in this disclosure), etc. The operating system 532 may facilitate resource management and operation of the computer system 502. Examples of the operating systems 532 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. The user interface 534 may facilitate display, execution, interaction, manipulation, or operation of program components through textual or graphical facilities. For example, user interfaces may provide computer interaction interface elements on a display system operatively connected to the computer system 502, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, the computer system 502 may implement a web browser 536 stored program component. The web browser 536 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, the computer system 502 may implement the mail server 538 stored program component. The mail server 538 may be an Internet mail server such as MICROSOFT® EXCHANGE® mail server, or the like. The mail server 538 may utilize facilities such as ASP, ActiveX, ANSI C++/C #. MICROSOFT .NET® programming language, CGI scripts, JAVA® programming language, JAVASCRIPT® programming language, PERL® programming language, PHP® programming language, PYTHON® programming language, WebObjects, etc. The mail server 538 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 502 may implement the mail client 540 stored program component. The mail client 540 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, the computer system 502 may store the user/application data 542, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

As will be appreciated by those skilled in the art, the techniques described in the various embodiments discussed above pertain to validating data for using at target applications. The techniques employs AI technology which provide for reducing or eliminating test data management for various different types of data testing, as the AI technology is capable of configuring the test data. Further, the techniques provide for validating all types of data based on the business rules or transformation rules applied by businesses during processing the data between different source and target. By way of en example, the techniques provide for validating all types of data during processing the data between RDBMS database to NoSQL database or vice versa. Similarly, the techniques may be used to validate the data coming from different sources such as RDBMS, files, Pdf's, XML/JSON to any target. Further, the techniques work effectively for both cloud and on premises servers.

Various embodiments provides method and system for managing IOPS in fiber channel network topology. In particular, the method uses deep learning technique to resolve the problem of the fixed set of bandwidths. Further, it helps to understand the behavior of usage, patterns of fiber channel network topology and determines the dynamic bandwidth rates. Using the behaviors, the method starts manipulating and sets out the bandwidth of the topology dynamically. This further helps to reduce the bandwidth cost, latency and enhances the buffer computation. Additionally, the propagation delay is also managed.

Moreover, to reduce the overall cost and estimation of maintaining data center, the method discloses clustering of switches in the fiber channel network topology, according to bandwidth capacity. Thereafter, the bandwidth sharing with various switches is implemented, which provides on demand fiber channel speed. This helps to increase performance for write and read IOPS and there is no constraint with bandwidth. Further, the point in time replication and recover objective may have the benefit to complete the replication with less amount of time.

The method further provides improved and high availability in real time operations and reduces remote direct memory access error in high performance computing switches. Moreover, without increase in cost the method modulates the unused bandwidth with required fabric for transaction of IOPS. Further, the method provides for configuring the switch and controller to work for critical IOPS migration. Additionally, the method provides for IOPS distribution according to the requirement to be operated using the architecture design. Further, the method reduces the latency and finishes the migration with point in time.

The specification has described system and method of managing IOPS in the fiber channel network topology. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of managing Input Output per Second (IOPS) in Fiber Channel (FC) network topology comprising a plurality of switches, the method comprising:
    initializing, by an IOPS managing device, a plurality of network parameters associated with the plurality of switches into a plurality of dependent variables and a plurality of independent variables for each of the plurality of switches;
    performing for each of the plurality of switches, by the IOPS managing device, a multilinear regression analysis on at least one of the plurality of dependent variables and at least one of the plurality of independent variables to predict a value of the at least one dependent variable;
    clustering, by the IOPS managing device, the plurality of switches into a plurality of categories based on the value of the at least one of the plurality of dependent variables associated with each of the plurality of switches;
    determining, by the IOPS managing device, a plurality of routes between a source switch and a destination switch associated with an IOPS request;
    establishing, by the IOPS managing device, a connection between the source switch and the destination switch through a shortest route from the plurality of routes, wherein the shortest route comprises a subset of switches from the plurality of switches; and
    for each switch in the subset, modulating, by the IOPS managing device, a bandwidth according to an IOPS associated with the IOPS request and a category of the plurality of categories associated with each switch in the subset.

2. The method of claim 1, further comprising storing the IOPS request and switch details associated with the source switch and the destination switch within a memory.

3. The method of claim 2, wherein the switch details comprises at least one of an IP address, port Identifier (ID), or bandwidth requirement.

4. The method of claim 1, wherein the plurality of independent variables comprises at least one of cache size, cache transaction, CPU usage, fragmentation ratio, packet size, buffer consumption or jitter rate.

5. The method of claim 1, wherein the plurality of dependent variable comprises at least one of IOPS, bandwidth jitter rate, latency, maximum frame rate, maximum throughput, maximum concurrent connection, or error rate, wherein the plurality of dependent variables are used to predict the slope and intercept to cluster the plurality of switches.

6. The method of claim 1, wherein a switch within the plurality of switches comprises at least of one unique ID of each of the plurality of switches, a connection of the switch to each of the plurality of switches, and a number of switches between two distinct switches in the plurality of switches.

7. The method of claim 1, wherein the plurality of categories comprises a high active category, a moderate active category, and a least active category, wherein a first predefined value range of each of the plurality of dependent variables is associated with the high active category, a second predefined value range of each of the plurality of dependent variables is associated with the moderate active category, and a third predefined value range of each of the plurality of dependent variables is associated with the least active category.

8. The method of claim 7, wherein the clustering comprises classifying the plurality of switches based on the first predefined value range, the second predefined value range, and the third predefined value range.

9. The method of claim 1, further comprising:
    determining whether a category of the plurality of categories associated with each switch in the first subset matches with IOPS attributes of the IOPS request, wherein the IOPS attributes correspond to the plurality of dependent variables; and
    selecting a route from the plurality of routes arranged in an ascending order, when at least one switch in the first subset does not match with the IOPS attributes, wherein the route succeeds the shortest route in the ascending order, and wherein the route comprises a second subset of switches from the plurality of switches.

10. The method of claim 9, further comprising establishing a connection between the source switch and the destination switch through the route, when each switch in the second subset matches with IOPS attributes of the IOPS request.

11. An Input Output per Second (IOPS) managing device for managing IOPS in Fiber Channel (FC) network topology comprising a plurality of switches, the IOPS managing device comprising:
    a processor; and
    a memory communicatively coupled to the processor, wherein the memory stores processor instructions, which, on execution, causes the processor to:
    initialize a plurality of network parameters associated with the plurality of switches into a plurality of dependent variables and a plurality of independent variables for each of the plurality of switches;
    perform for each of the plurality of switches a multilinear regression analysis on at least one of the plurality of dependent variables and at least one of the plurality of independent variables to predict a value of the at least one dependent variable;
    cluster the plurality of switches into a plurality of categories based on the value of the at least one of the plurality of dependent variables associated with each of the plurality of switches;
    determine a plurality of routes between a source switch and a destination switch associated with an IOPS request;
    establish a connection between the source switch and the destination switch through a shortest route from the plurality of routes, wherein the shortest route comprises a subset of switches from the plurality of switches; and
    modulate for each switch in the subset, a bandwidth according to an IOPS associated with the IOPS request and a category of the plurality of categories associated with each switch in the subset.

12. The IOPS managing device of claim 11, wherein the processor instructions further cause the processor to store the IOPS request and switch details associated with the source switch and the destination switch within a memory.

13. The IOPS managing device of claim 12, wherein the switch details comprises at least one of an IP address, port Identifier (ID), or bandwidth requirement.

14. The IOPS managing device of claim 11, wherein a switch within the plurality of switches comprises at least of one unique ID of each of the plurality of switches, a connection of the switch to each of the plurality of switches, and a number of switches between two distinct switches in the plurality of switches.

15. The IOPS managing device of claim 11, wherein the plurality of categories comprises a high active category, a moderate active category, and a least active category, wherein a first predefined value range of each of the plurality of dependent variables is associated with the high active category, a second predefined value range of each of the plurality of dependent variables is associated with the moderate active category, and a third predefined value range of each of the plurality of dependent variables is associated with the least active category.

16. The IOPS managing device of claim 15, wherein the clustering comprises classifying the plurality of switches based on the first predefined value range, the second predefined value range, and the third predefined value range.

17. The IOPS managing device of claim 11, wherein the processor instructions further cause the processor to:
    determine whether a category of the plurality of categories associated with each switch in the first subset matches with IOPS attributes of the IOPS request, wherein the IOPS attributes correspond to the plurality of dependent variables; and
    select a route from the plurality of routes arranged in an ascending order, when at least one switch in the first subset does not match with the IOPS attributes, wherein the route succeeds the shortest route in the ascending order, and wherein the route comprises a second subset of switches from the plurality of switches.

18. The IOPS managing device of claim 17, wherein the processor instructions further cause the processor to establish a connection between the source switch and the destination switch through the route, when each switch in the second subset matches with IOPS attributes of the IOPS request.

19. A non-transitory computer-readable storage medium having stored thereon, a set of computer-executable instructions causing a computer comprising one or more processors to perform steps comprising:
    initializing a plurality of network parameters associated with the plurality of switches into a plurality of dependent variables and a plurality of independent variables for each of the plurality of switches;
    performing for each of the plurality of switches, a multilinear regression analysis on at least one of the plurality of dependent variables and at least one of the plurality of independent variables to predict a value of the at least one dependent variable;
    clustering the plurality of switches into a plurality of categories based on the value of the at least one of the plurality of dependent variables associated with each of the plurality of switches;
    determining a plurality of routes between a source switch and a destination switch associated with an IOPS request;
    establishing a connection between the source switch and the destination switch through a shortest route from the plurality of routes, wherein the shortest route comprises a subset of switches from the plurality of switches; and
    for each switch in the subset, modulating a bandwidth according to an IOPS associated with the IOPS request and a category of the plurality of categories associated with each switch in the subset.

* * * * *